United States Patent
Kotrla et al.

(10) Patent No.: US 8,630,188 B2
(45) Date of Patent: *Jan. 14, 2014

(54) MONITORING LINK AGGREGATION LINKS

(75) Inventors: Scott R Kotrla, Wylie, TX (US);
Howard H Chiu, Plano, TX (US);
Donald Pitchforth, Jr., Rockwall, TX (US); Michael U Bencheck, Richardson, TX (US); Richard C Schell, Allen, TX (US); Matthew W Turlington, Richardson, TX (US); Glenn Wellbrock, Wylie, TX (US); James D Lee, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 358 days.

This patent is subject to a terminal disclaimer.

(21) Appl. No.: 12/945,414

(22) Filed: Nov. 12, 2010

(65) Prior Publication Data
US 2011/0058487 A1 Mar. 10, 2011

Related U.S. Application Data

(63) Continuation of application No. 11/550,085, filed on Oct. 17, 2006, now Pat. No. 7,929,448.

(51) Int. Cl.
*G01R 31/08* (2006.01)
(52) U.S. Cl.
USPC ............................ 370/242; 370/224; 370/248
(58) Field of Classification Search
None
See application file for complete search history.

(56) References Cited

U.S. PATENT DOCUMENTS

| | | | |
|---|---|---|---|
| 3,712,536 A | 1/1973 | Griffiths | |
| 4,888,586 A | 12/1989 | Ise et al. | |
| 6,181,676 B1 | 1/2001 | Yao et al. | |
| 6,560,463 B1 | 5/2003 | Santhoff | |
| 6,657,952 B1 | 12/2003 | Shiragaki et al. | |
| 6,775,237 B2 | 8/2004 | Soltysiak et al. | |
| 6,877,105 B1 * | 4/2005 | Watanabe et al. | 714/4.4 |
| 7,451,362 B2 | 11/2008 | Chen et al. | |
| 2004/0042396 A1 | 3/2004 | Brown et al. | |
| 2004/0085894 A1 * | 5/2004 | Wang et al. | 370/216 |
| 2005/0249123 A1 | 11/2005 | Finn | |
| 2005/0265330 A1 | 12/2005 | Suzuki et al. | |
| 2007/0255819 A1 * | 11/2007 | Hua et al. | 709/224 |

FOREIGN PATENT DOCUMENTS

EP 0920153 6/1999

OTHER PUBLICATIONS

The Institute of Electrical and Electronics Engineers, Inc., "IEEE Stand for Information technology—Telecommunications and information exchange between systems—Local and metropolitan area networks—Specific requirements, Part 3: Carrier sense multiple access with collision detection (CSMA/CD) access method and physical layer specifications", IEEE Std 802.3-2002, Mar. 8, 2002, 1563 pages.

Harry Reynolds & Doug Marschke, "JUNOS Enterprise Switching", 2009, O'Reilly Media, Inc., ISBN 978-0-596-15397-7, p. 615.

\* cited by examiner

*Primary Examiner* — Kevin C Harper
*Assistant Examiner* — Samina Choudhry

(57) ABSTRACT

A device detects a signal condition for a link aggregation group (LAG) link, compares the detected signal condition to a signal threshold range, and enables one of a disabled state or a disabled timer state for the LAG link if the detected signal condition is outside the signal threshold range.

21 Claims, 7 Drawing Sheets

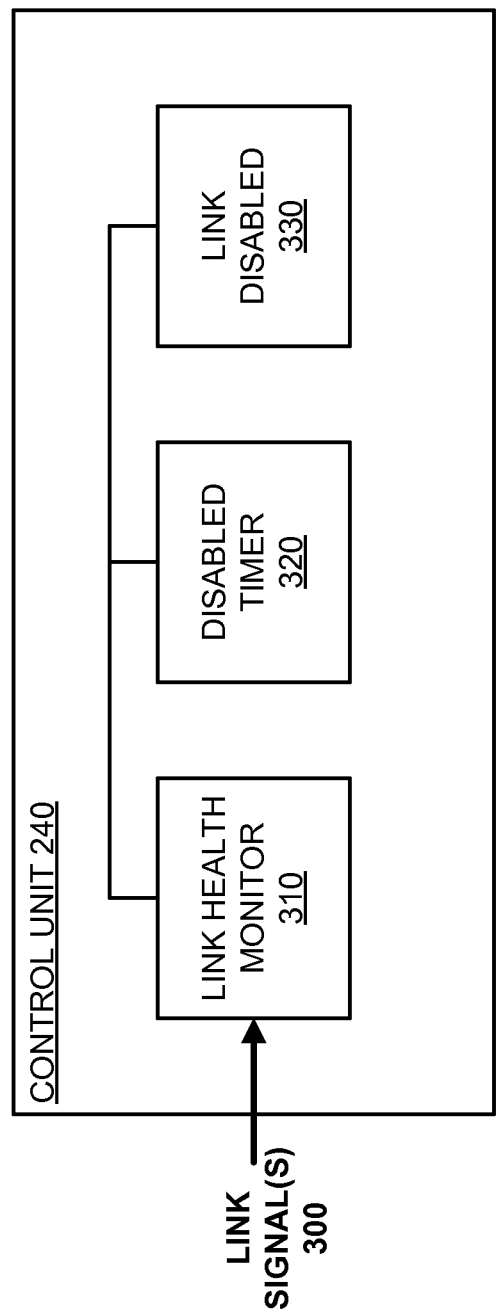

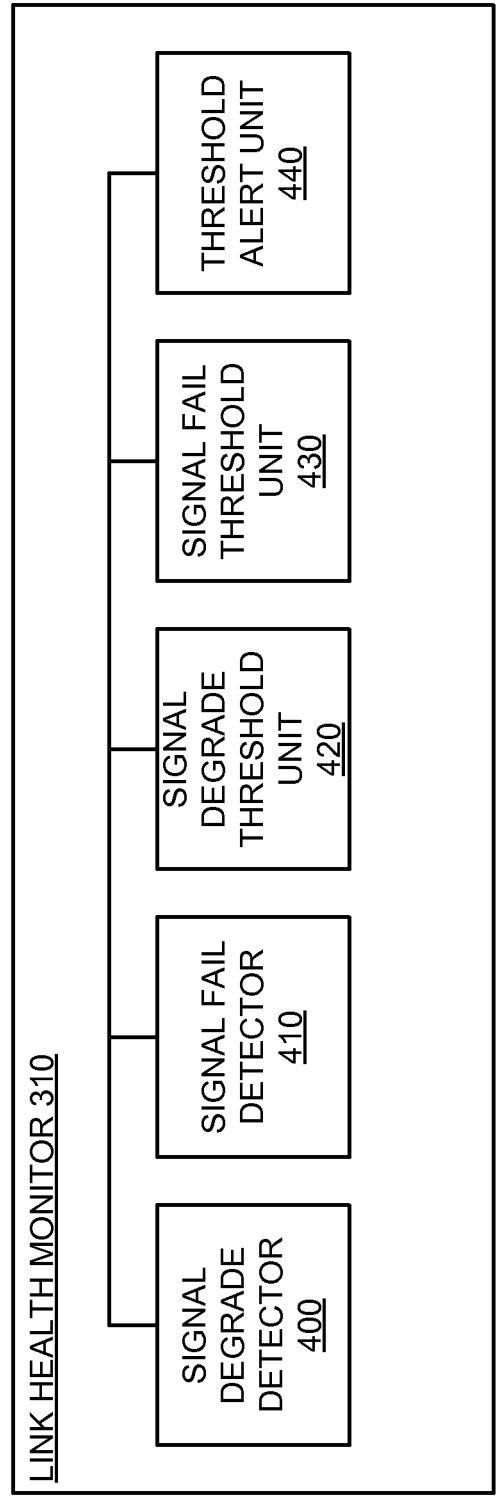

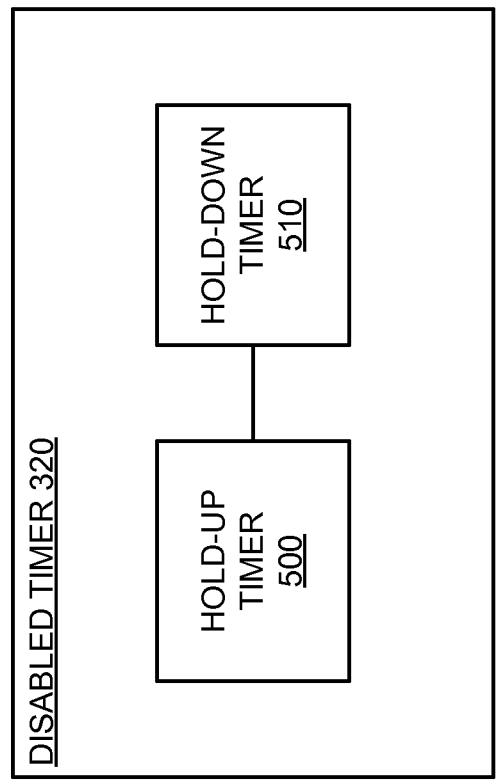

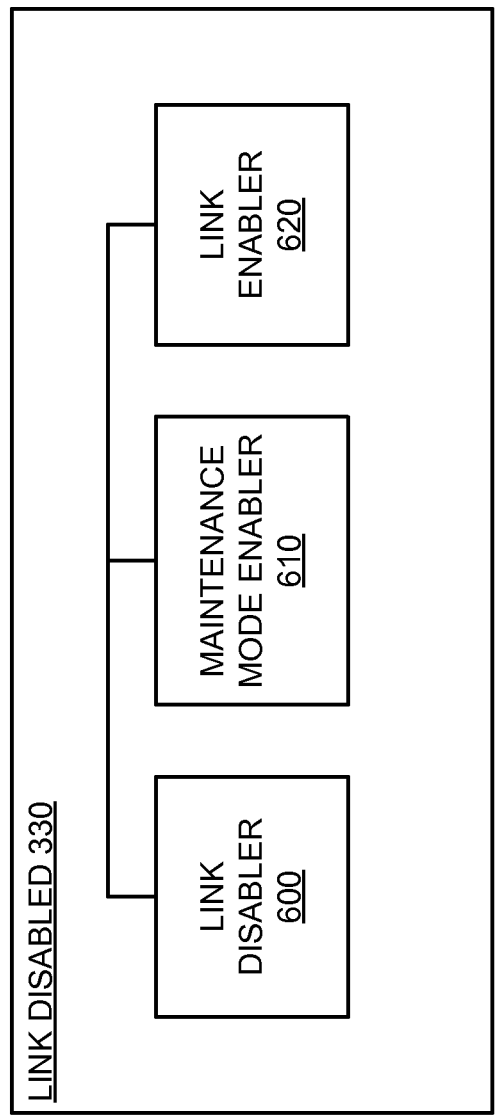

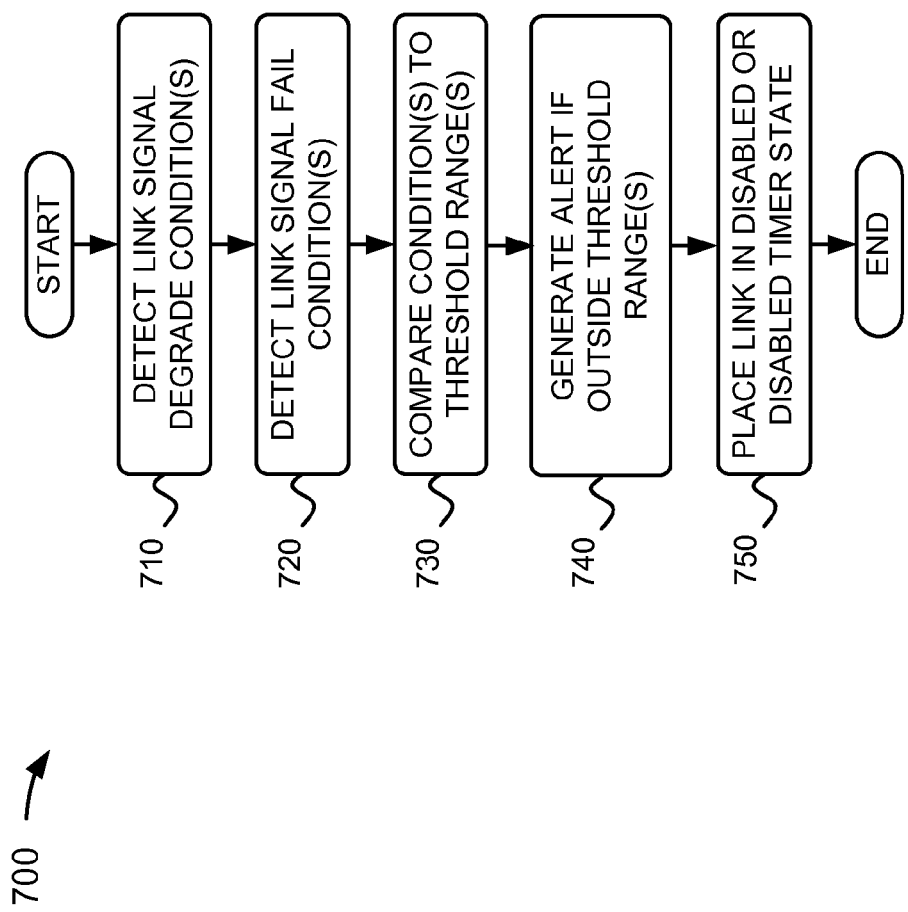

MONITORING LINK AGGREGATION LINKS

RELATED APPLICATION

This application is a continuation of U.S. patent application Ser. No. 11/550,085, filed Oct. 17, 2006, which is incorporated herein by reference.

BACKGROUND INFORMATION

A link aggregation (e.g., as set forth in IEEE 802.3ad) is a computer networking term which describes using multiple links (e.g., Ethernet network cables and/or ports in parallel) as one logical port to increase the link speed beyond the limits of any one single link Other terms used for link aggregation may include Ethernet trunking, network interface card (NIC) teaming, port teaming, NIC bonding, and/or link aggregation group (LAG). LAG will be used hereinafter to refer to link aggregation.

LAG is an inexpensive way to set up a high-speed backbone network that may transfer more datagrams than any one single port or device can utilize. A "datagram(s)" may include any type or form of data, such as packet or non-packet data. LAG may permit several devices to communicate simultaneously at their full single-port speed, while not permitting any one single device to monopolize all available backbone capacity. Network datagrams may be dynamically distributed across ports so that administration of what datagrams actually flow across a given port may be taken care of automatically with the LAG.

LAGs also provide reliability. Should one of the multiple ports used in a LAG fail, network traffic (e.g., datagrams) may be dynamically redirected to flow across the remaining good ports in the LAG. The redirection may be triggered when a switch learns that a media access control (MAC) address has been automatically reassigned from one LAG port to another port in the same LAG. The switch may send the datagrams to the new LAG port, and the network may continue to operate with virtually no interruption in service.

A LAG protocol (LAP), such as the LAP set forth in IEEE 802.3ad, allows one or more links to be aggregated together to form a LAG. Once implemented, the LAG can be configured and reconfigured quickly and automatically with a low risk of duplication or rendering of frames.

Typical Ethernet LAG arrangements fail to utilize information beyond a binary up/down state of the member links (e.g., ports) in the LAG. That is, a link is either available for datagram(s) to be transmitted across it (e.g., up), or not available for use under any circumstances (e.g., down). The health of a typical LAG link can not be monitored while the LAG link is actively used. When a typical LAG link comes into service, a timer can be used to determine how long the link has to be up before datagram(s) are transmitted across it. However, during this time period, the link can not be used under any circumstances, even failure of other links in the LAG.

BRIEF DESCRIPTION OF THE DRAWINGS

The accompanying drawings, which are incorporated in and constitute a part of this specification, illustrate an embodiment of the invention and, together with the description, explain the invention. In the drawings:

FIG. 3 is a diagram of an exemplary control unit of the network device of FIG. 2;

FIG. 4 is an exemplary diagram showing the operations performed by a link health monitor portion of the control unit of FIG. 3;

FIG. 5 is an exemplary diagram showing the operations performed by a disabled timer portion of the control unit of FIG. 3;

FIG. 6 is an exemplary diagram showing the operations performed by a link disabled portion of the control unit of FIG. 3; and FIG. 7 is a flowchart of an exemplary process for a network and/or a network device of FIG. 1 according to implementations consistent with principles of the invention.

DETAILED DESCRIPTION OF PREFERRED EMBODIMENTS

The following detailed description of the invention refers to the accompanying drawings. The same reference numbers in different drawings may identify the same or similar elements. Also, the following detailed description does not limit the invention.

Implementations described herein may provide systems and methods that detect LAG link signal degradation and/or failure conditions, and compare the detected conditions to signal degradation and/or failure threshold ranges. The systems and methods may also generate an alert for the LAG link and may place the LAG link in a disabled timer state and/or a disabled state if the detected conditions of the LAG link are outside the signal degradation and/or failure threshold ranges.

Figure 1:
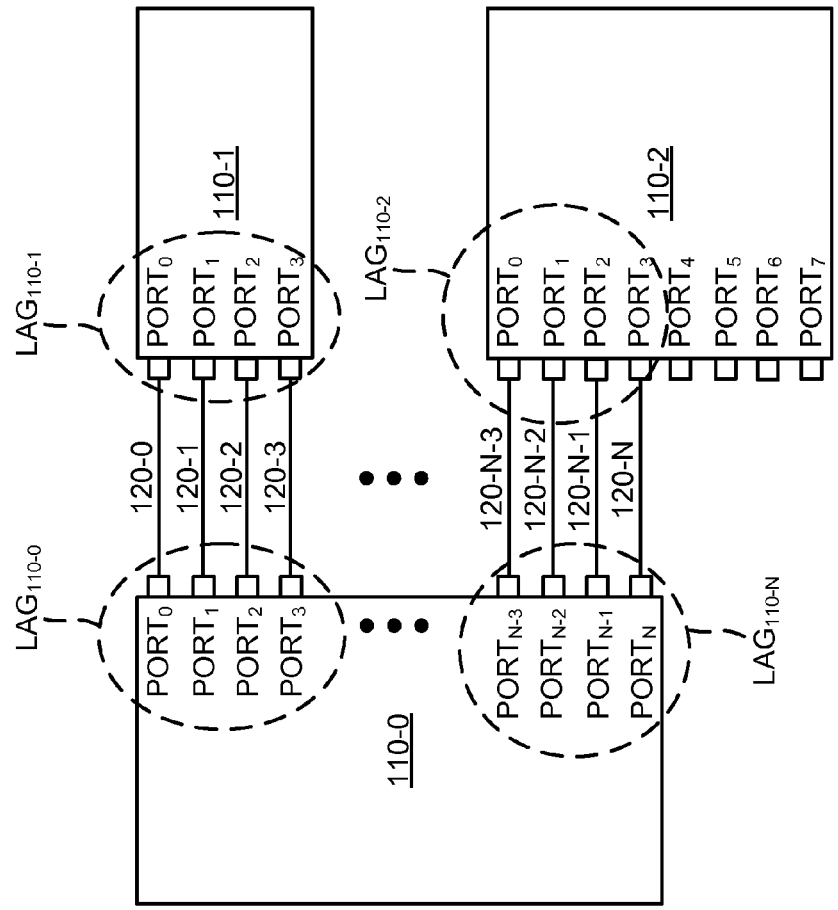
FIG. 1 is a diagram illustrating an exemplary network in which systems and methods consistent with principles of the invention may be implemented.

FIG. 1 is a diagram illustrating an exemplary network 100 in which systems and methods consistent with principles of the invention may be implemented. Network 100 may include, for example, a local area network (LAN), a private network (e.g., a company intranet), a wide area network (WAN), a metropolitan area network (MAN), or another type of network.

As shown in FIG. 1, network 100 may include network devices 110-0, 110-1 and 110-2 (collectively referred to as network devices 110) interconnected by links 120-0, . . . , 120-N (collectively referred to as links 120). While three network devices 110 and eight links 120 are shown in FIG. 1, more or fewer network devices 110 and/or links 120 may be used in other implementations consistent with principles of the invention. Network 100 may also include other components, devices, etc. (not shown in FIG. 1).

Network device 110 may include a variety of network devices. For example, network device 110 may include a computer, a router, a switch, a network interface card (NIC), a hub, a bridge, etc. Links 120 may include a path that permits communication among devices 110, such as wired, wireless, and/or optical connections, input ports, output ports, etc. For example, network device 110-0 may include ports $PORT_0$, $PORT_1$, . . . , $PORT_N$, network device 110-1 may include ports $PORT_0$, $PORT_1$, $PORT_2$, $PORT_3$, and network device 110-2 may include ports $PORT_0$, $PORT_1$, . . . , $PORT_7$. The ports of network devices 110 may be considered part of corresponding links 120 and may be either input ports, output ports, or combinations of input and output ports. While eight ports for network device 110-0, four ports for network device 110-1, and eight ports for network device 110-2 are shown in FIG. 1, more or fewer ports may be used in other implementations consistent with principles of the invention.

In an exemplary implementation, network devices 110 may provide entry and/or exit points for datagrams in network 100. Since Ethernet may be bi-directional, the ports (e.g., $PORT_0, \ldots$, and $PORT_N$) of network device 110-0 may send and/or receive datagrams. The ports (e.g., $PORT_0$, $PORT_1$, $PORT_2$, and $PORT_3$) of network device 110-1 and the ports (e.g., $PORT_0, \ldots$, and $PORT_7$) of network device 110-2 may likewise send and/or receive datagrams.

A LAG may be established between network devices 110-0 and 110-1. For example, ports $PORT_0, \ldots$, and $PORT_3$ of network device 110-0 may be grouped together into a $LAG_{110-0}$ that may communicate bi-directionally with ports $PORT_0$, $PORT_1$, $PORT_2$, and $PORT_3$ of network device 110-1, via links 120-0, 120-1, 120-2, and 120-3. Ports $PORT_0$, $PORT_1$, $PORT_2$, and $PORT_3$ of network device 110-1 may be grouped together into a $LAG_{110-0}$. $LAG_{110-0}$ and $LAG_{110-1}$ may permit ports $PORT_0$, $PORT_1$, $PORT_2$, and $PORT_3$ of network device 110-0 and ports $PORT_0$, $PORT_1$, $PORT_2$, and $PORT_3$ of network device 110-1 to communicate bi-directionally. Datagrams may be dynamically distributed between ports (e.g., $PORT_0$, $PORT_1$, $PORT_2$, and $PORT_3$) of network device 110-0 and ports (e.g., $PORT_0$, $PORT_1$, $PORT_2$, and $PORT_3$) of network device 110-1 so that administration of what datagrams actually flow across a given link (e.g., links 120-0, $\ldots$, and 120-3) may be automatically handled by $LAG_{110-0}$ and $LAG_{110-1}$.

In another implementation, a LAG may be established between network devices 110-0 and 110-2. For example, ports $PORT_{N-3}, \ldots$, and $PORT_N$ of network device 110-0 may be grouped together into a $LAG_{110-N}$ that may communicate bi-directionally with ports $PORT_0$, $PORT_1$, $PORT_2$, and $PORT_3$ of network device 110-2, via links 120-N-3, 120-N-2, 120-N-1, and 120-N. Ports $PORT_0$, $PORT_1$, $PORT_2$, and $PORT_3$ of network device 110-2 may be grouped together into a $LAG_{110-2}$. $LAG_{110-N}$ and $LAG_{110-2}$ may permit ports $PORT_{N-3}, \ldots$, and $PORUT_N$ of network device 110-0 and ports $PORT_0$, $PORT_1$, $PORT_2$, and $PORT_3$ of network device 110-2 to communicate bi-directionally. Datagrams may be dynamically distributed between ports (e.g., $PORT_{N-3}, \ldots$, and $PORT_N$) of network device 110-0 and ports (e.g., $PORT_0$, $PORT_1$, $PORT_2$, and $PORT_3$) of network device 110-2 so that administration of what datagrams actually flow across a given link (e.g., links 120-N-3, $\ldots$, and 120-N) may be automatically handled by $LAG_{110-N}$ and $LAG_{110-2}$. With such an arrangement, network devices 110 may transmit and receive datagrams simultaneously on all links within a LAG established by network devices 110.

Every port in network devices 110 may be associated with a real MAC address. Datagrams originating from a port may include the real MAC address of the port in a source MAC address field, and datagrams transmitted to a port may include the real MAC address of the port in a destination MAC address field. Under the seven layer OSI reference model, the LAG layer may be a sub-layer of the data link layer and may be located above the MAC sub-layer. The LAG layer may replace the MAC addresses of a port in a LAG with a LAG MAC address. For example, $LAG_{110-0}$ may replace the MAC addresses of ports $PORT_0, \ldots$, $PORT_3$ with a LAG MAC address. Thus, datagrams exiting a port of a LAG may have the LAG MAC address in a source address field of the Ethernet frame, and datagrams entering a port of a LAG may have the LAG MAC address in a destination address field. In one implementation, the LAG MAC address may be established as set forth in co-pending application Ser. No. 11/550,015, entitled "LINKED AGGREGATION," filed on the same date herewith, the disclosure of which is incorporated by reference herein in its entirety.

Figure 2:
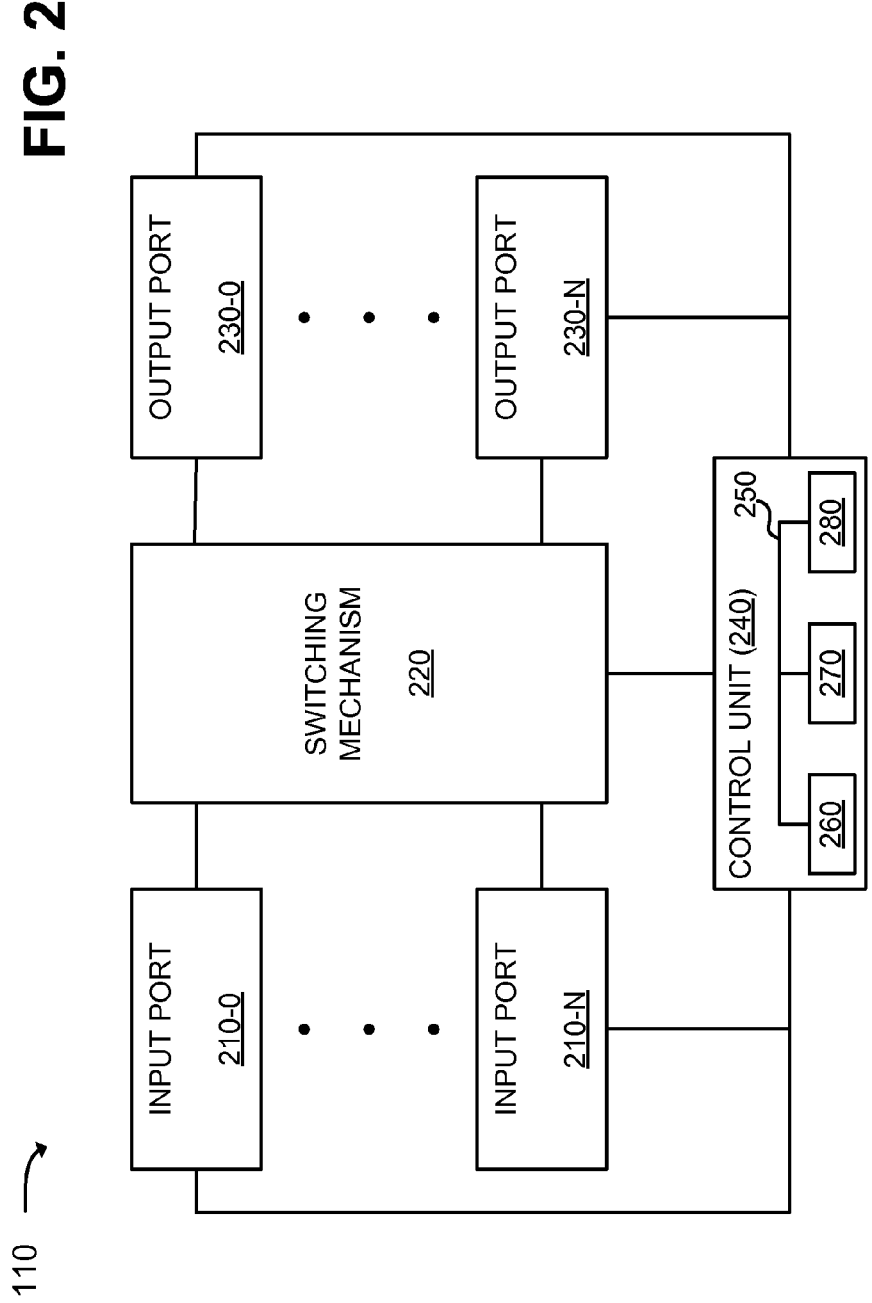
FIG. 2 is a diagram of an exemplary network device of FIG. 1.

FIG. 2 is an exemplary diagram of a device that may correspond to one of network devices 110 of FIG. 1. The device may include input ports 210, a switching mechanism 220, output ports 230, and a control unit 240. Input ports 210 may be the point of attachment for a physical link (e.g., link 120) (not shown) and may be the point of entry for incoming datagrams. Switching mechanism 220 may interconnect input ports 210 with output ports 230. Output ports 230 may store datagrams and may schedule datagrams for service on an output link (e.g., link 120) (not shown). Control unit 240 may use routing protocols and one or more forwarding tables for forwarding datagrams.

Input ports 210 may carry out data link layer encapsulation and decapsulation. Input ports 210 may look up a destination address of an incoming datagram in a forwarding table to determine its destination port (i.e., route lookup). In order to provide quality of service (QoS) guarantees, input ports 210 may classify datagrams into predefined service classes. Input ports 210 may run data link-level protocols or network-level protocols. In other implementations, input ports 210 may send (e.g., may be an exit point) and/or receive (e.g., may be an entry point) datagrams.

Switching mechanism 220 may be implemented using many different techniques. For example, switching mechanism 220 may include busses, crossbars, and/or shared memories. The simplest switching mechanism 220 may be a bus that links input ports 210 and output ports 230. A crossbar may provide multiple simultaneous data paths through switching mechanism 220. In a shared-memory switching mechanism 220, incoming datagrams may be stored in a shared memory and pointers to datagrams may be switched.

Output ports 230 may store datagrams before they are transmitted on an output link (e.g., link 120). Output ports 230 may include scheduling algorithms that support priorities and guarantees. Output ports 230 may support data link layer encapsulation and decapsulation, and/or a variety of higher-level protocols. In other implementations, output ports 230 may send (e.g., may be an exit point) and/or receive (e.g., may be an entry point) datagrams.

Control unit 240 may interconnect with input ports 210, switching mechanism 220, and output ports 230. Control unit 240 may compute a forwarding table, implement routing protocols, and/or run software to configure and manage network device 110. Control unit 240 may handle any datagram whose destination address may not be found in the forwarding table.

In one implementation, control unit 240 may include a bus 250 that may include a path that permits communication among a processor 260, a memory 270, and a communication interface 280. Processor 260 may include a microprocessor or processing logic that may interpret and execute instructions. Memory 270 may include a random access memory (RAM), a read only memory (ROM) device, a magnetic and/or optical recording medium and its corresponding drive, and/or another type of static and/or dynamic storage device that may store information and instructions for execution by processor 260. Communication interface 280 may include any transceiver-like mechanism that enables control unit 240 to communicate with other devices and/or systems.

Network device 110 may perform certain operations, as described in detail below. Network device 110 may perform these operations in response to processor 260 executing software instructions contained in a computer-readable medium, such as memory 270. A computer-readable medium may be defined as a physical or logical memory device and/or carrier wave.

The software instructions may be read into memory 270 from another computer-readable medium, such as a data storage device, or from another device via communication interface 280. The software instructions contained in memory 270 may cause processor 260 to perform processes that will be described later. Alternatively, hardwired circuitry may be used in place of or in combination with software instructions to implement processes consistent with principles of the invention. Thus, implementations consistent with principles of the invention are not limited to any specific combination of hardware circuitry and software.

LAGs may be created with two or more links (e.g., input ports 210 or output ports 230) of network device 110 with LAG MAC addressing. FIG. 3 provides a diagram showing exemplary operations performed by control unit 240 of network device 110. For example, control unit 240 may receive link signal(s) 300 and may include a link health monitor 310, a disabled timer portion 320, and a link disabled portion 320. Each of the components shown in FIG. 3 may be interrelated with each other. Control unit 240 may alternatively include other components and/or component interrelations not shown in FIG. 3.

Link health monitor 310 may monitor and identify problems with the health (e.g., the operational state) of a link in a LAG. For example, if an active or inactive link has health problems (e.g., loss or degradation of a link signal, a remote link fault message, etc.), link health monitor 310 may provide information indicating such problems. It may be determined based on the problem information whether a link is down (i.e., not operational). For example, if link health monitor 310 detects a signal and does not detect a remote link fault message, link health monitor 310 may provide information indicating signal detection and no remote link fault message to disabled timer portion 320. Disabled timer portion 320 may place the link in a disabled timer state.

Disabled timer portion 320 may include a hold-up timer that may prevent a link from becoming active until the hold-up timer has elapsed. If a link is under control of disabled timer portion 320 (i.e., in a disabled timer state), datagrams may be received by the link but may be prevented from being transmitted by the link. If the hold-up timer has elapsed, disabled timer portion 320 may provide information indicating that the hold-up timer has elapsed, and a link may be made active (i.e., datagrams may be transmitted and/or received by the link). If there are no active links in a LAG, disabled timer portion 320 may provide information indicating that there are no active links in the LAG, and a link may be made active (i.e., in an active state). Such an arrangement may prevent complete failure of a LAG by enabling datagrams to be transmitted and/or received by the activated link. If signal failure or degradation is detected, a manual disable command is received, or a remote disable message is received, link health monitor 310 or disabled timer portion 320 may provide information indicating the aforementioned condition(s) to link disabled portion 330.

As further shown in FIG. 3, link disabled portion 330 may disable a link if it receives, for example, information indicating signal degradation or failure, a manual disable command, and/or a remote disable message. If a link is in a disabled state, datagrams may be received by the link but may be prevented from being transmitted by the link. If no signal failure is detected, a manual disable command is no longer in effect, or a remote disable message is no longer received, link disabled portion 330 may provide information indicating the aforementioned condition(s) to disabled timer portion 320, and disabled timer portion 320 may start the hold-up timer. If there are no active links in a LAG, link disabled portion 330 may provide information indicating that there are no active links in the LAG, and a link may be made active.

FIGS. 4-6 are exemplary diagrams of the components of control unit 240 of network device 110.

Link health monitor 310, as shown in FIG. 4, may perform a variety of tasks to aid in monitoring the health of inactive and/or active links in a LAG. For example, in one implementation, link health monitor 310 may include a signal degrade detector 400, a signal fail detector 410, a signal degrade threshold unit 420, a signal fail threshold unit 430, and a threshold alert unit 440. Signal degrade detector 400 may detect signal degrade condition(s) for incoming link signal(s) based on errored frames (e.g., link-level datagrams) and/or based on an 8B/10B code violation rate. "8B/10B code" is a line code that maps eight-bit symbols to ten-bit symbols to achieve direct current (DC) balance and bounded disparity. Both errored frames and 8B/10B code violations may be used by signal degrade detector 400 so that network device 110 may respond to link degradation. 8B/10B may have the additional benefits of being available regardless of datagram traffic load, not varying with frame size, and/or being monitored when a link is not actively configured for datagram traffic.

Signal fail detector 410 may detect signal failure condition(s) for incoming link signal(s) based on errored frames and/or based on an 8B/10B code violation rate. Both errored frames and 8B/10B code violations may be used by signal fail detector 410 so that network device 110 may respond to link failure.

Signal degrade threshold unit 420 may provide a configurable signal degrade threshold range based on errored frames (e.g., about 1 to about 1,000 errored frames in about 100,000 to about 1,000,000 received frames). A configurable signal degrade threshold range based on the 8B/10B code violation rate (e.g., about $10^{-5}$ to about $10^{-9}$) may also be provided by signal degrade threshold unit 420. Signal degrade threshold unit 420 may also provide a clearing threshold range (i.e., a threshold range indicating a signal is functioning properly) based on errored frames and/or the 8B/10B code violation rate. For example, in one implementation, a clearing threshold range of one-tenth the threshold range for declaring a signal degrade condition may be provided by signal degrade threshold unit 420.

Signal fail threshold unit 430 may provide a configurable signal failure threshold range based on errored frames (e.g., about 1 to about 1,000 errored frames in about 1,000 to about 100,000 received frames). A configurable signal failure threshold range based on the 8B/10B code violation rate (e.g., about $10^{-3}$ to about $10^{-5}$) may also be provided by signal fail threshold unit 430. Signal fail threshold unit 430 may also provide a clearing threshold range based on errored frames and/or the 8B/10B code violation rate. For example, in one implementation, a clearing threshold range of one-tenth the threshold range for declaring a signal failure condition may be provided by signal fail threshold unit 430.

If a detected signal degrade or signal failure condition is outside of one of the threshold ranges provided by signal degrade threshold unit 420 or signal fail threshold unit 430, threshold alert unit 440 may generate an alert indicating an appropriate signal threshold violation. Threshold alert unit 440 may send the alert, and network device 110 may disable the link as described above and below. In one implementation, for example, to signal that a LAG link should be disabled either through manual disabling, signal degrade condition detection, or signal failure detection, network device 110 may send an event notification of the type "Errored Frame Seconds Summary Event TLV" with the "Errored Frame Second Summary" field set to "1's" (e.g., as set forth in Modified IEEE 802.3ah, Clause 57.5.3.4, item f) to a far end of the LAG link (e.g., to another network device 110 connected to the link). This may indicate to the far end of the link that there may be more Errored Frame Seconds than an allowable upper boundary (e.g., 900 seconds as defined by the "Errored Frame Second Summary" field). If an "Errored Frame Seconds Summary Event TLV" with the "Errored Frame Second Summary" field set to "1's" is received, network device 110 may disable the link Threshold alert unit 440 may also generate an alert when a signal degrade condition or a signal failure condition is cleared.

Although FIG. 4 shows exemplary tasks performed by link health monitor 310, in other implementations, link health monitor 310 may perform additional tasks that may be used to aid in monitoring the health of links in a LAG.

Disabled timer portion 320, as shown in FIG. 5, may perform a variety of tasks to aid in moving datagrams between links when one or more links are coming in and out of service (e.g., active and disabled states). For example, in one implementation, disabled timer portion 320 may include a hold-up timer 500 and a hold-down timer 510. Hold-up timer 500 may provide a hold-up time that may be the waiting period after a link of a LAG has been declared trouble free and before it may receive datagrams. Hold-up timer 500 may provide a configurable hold-up time range (e.g., of about 5 to 12 minutes, in 1 minute increments). The link may transition to the disabled state (i.e., datagrams may be received by the link but may be prevented from being transmitted by the link) during the hold-up time. This may enable the link to be brought online for monitoring its health and for protection purposes, but may prevent datagrams from being transmitted by the link until the hold-up time has elapsed. The disabled link may be made active for sending and/or receiving datagrams at the end of the hold-up time period. For example, in one implementation described above in connection with FIG. 3, if the hold-up timer (e.g., hold-up timer 500) has elapsed, disabled timer portion 320 may provide information indicating that the hold-up timer has elapsed, and a link may be made active.

Hold-down timer 510 may provide a hold-down time that may be the waiting period for network device 110 to disallow datagram traffic onto a link of a LAG after the link has entered into a troubled state. Hold-down timer 510 may provide a configurable hold-down time range (e.g., of about 0 to 150 milliseconds, where "0" may indicate a link is disabled).

In one implementation, disabled timer portion 320 may signal a link failure by sending a signal with a "Link Fault" flag set to "1" as specified in Modified IEEE 802.3ah-2004, Clause 57.4.2.1. If network device 110 receives the signal with the "Link Fault" flag set to "1", network device 110 may disable the link once the hold-down time has elapsed.

Although FIG. 5 shows exemplary tasks performed by disabled timer portion 320, in other implementations, disabled timer portion 320 may perform additional tasks that may be used to aid in moving datagrams between links when one or more links are coming in and out of service.

Link disabled portion 330, as shown in FIG. 6, may perform a variety of tasks to aid in removing links from service or from a LAG. For example, in one implementation, link disabled portion 330 may include a link disabler 600, a maintenance mode enabler 610, and a link enabler 620. Link disabler 600 may disable any link within any of the LAGs created by network device 110, either through manual provisioning, signal degrade condition detection, or signal failure condition detection. A disabled link may remain in its LAG but may not transmit datagrams. A disabled link may, however, be capable of receiving and monitoring datagrams. If a link is disabled by link disabler 600, link disabler 600 may transmit a code (e.g., an "Offline" Remote Fault encoding per IEEE 802.3, Clause 37) to the far end of the link being disabled (e.g., to another network device 110 connected to the disabled link). If the disabled link code is received by a far end network device (e.g., network device 110 on the far end of the disabled link), the far end network device may disable the link.

Maintenance mode enabler 610 may permit a disabled link to be put in maintenance mode for trouble shooting purposes. During maintenance, system datagrams (e.g., datagrams transmitted and/or received by a link when a link is active) may be prevented from being transmitted and/or received by the disabled link, but test datagrams (e.g., datagrams used to test the functionality of a link) may be transmitted and/or received by the disabled link. Test datagrams may be used to determine the operational state of a disabled link, and/or to pinpoint problems with the disabled link.

Link enabler 620 may automatically enable a disabled link and may generate appropriate threshold clearing messages (e.g., to signal degrade threshold unit 420, signal fail threshold unit 430, and threshold alert unit 440 of link health monitor 310) to generate an alert when a signal degrade condition or a signal failure condition is cleared. Link enabler 620 may also accept a manual command to enable a disabled link that is not in maintenance mode. If all of the links in a LAG are disabled and to avoid complete LAG failure, link enabler 620 may automatically enable a disabled LAG link(s) that is not in maintenance mode. For example, in one implementation described above in connection with FIG. 3, if there are no active links in a LAG, link disabled portion 330 (e.g., link enabler 620) may provide information indicating that there are no active links in the LAG, and a link may be made active. If a disabled link is enabled by link enabler 620, network device 110 (e.g., link enabler 620) may transmit a signal to the far end of the link being enabled (e.g., to another network device 110 connected to the link). For example, link enabler 620 may signal the far end network device by transmitting an event notification of the type "Errored Frame Seconds Summary Event TLV" with the "Errored Frame Second Summary" field set to "0's" to the far end network device.

In one implementation, link enabler 620 may signal that a link has been made active by sending a signal with a "Link Fault" flag set to "0" as specified in Modified IEEE 802.3ah-2004, Clause 57.4.2.1. If network device 110 receives the signal with the "Link Fault" flag set to "0", network device 110 may put the link in service (e.g., in the disabled timer state) and may initiate hold-up timer 500.

Although FIG. 6 shows exemplary tasks performed by link disabled portion 330, in other implementations, link disabled portion 330 may perform additional tasks that may be used to aid in removing links from service or from a LAG.

In other implementations, network device 110 may perform additional tasks that may aid in monitoring the health of links of a LAG, without removing the link from service or from the LAG. For example, network device 110 may permit certain users (e.g., system administrators) to manually enable or disable a LAG link. Network device 110 may also support LAG provisioning across any physical module (e.g., interface modules, carrier modules, etc.) or slot provided within network device 110. In another example, network device 110 may provide the ability to add or remove any link to a particular LAG without impacting datagram traffic. Network device 110 may further deny manual or automatic disabling of a link of a LAG if the LAG is in service and the link is the last remaining active link of the LAG. Network device 110 may also provide a provisioning command enabling a LAG to be put in or out of service. If links of a particular LAG include either protected or unprotected synchronous optical network (SONET) facilities, network device 110 may upgrade the SONET bandwidth with minimum impact to the performance of the LAG.

In another example, network device 110 may support auto-negotiation per IEEE 802.3, Clauses 28 and 37, on LAG links. The auto-negotiation standard may allow devices based on several Ethernet standards (e.g., from 10BaseT to 1000BaseT) to coexist in a network by mitigating the risks of network disruption arising from incompatible technologies. Auto-negotiation may be used by network device 110 as a LAG link disabling mechanism. However, network device 110 may provide a default setting for auto-negotiation that enables (i.e., activates) links of a LAG. Network device 110 may signal a link failure by sending a "Link_Failure" Remote Fault encoding per IEEE 802.3, Clause 37, and may signal that a link has been restored by sending a "No Error, Link OK" Remote Fault encoding per IEEE 802.3, Clause 37. If network device 110 receives a "Link_Failure" Remote Fault encoding, network device 110 may remove the link from service once hold-down timer 510 has elapsed. If network device 110 receives a "No Error, Link OK" Remote Fault encoding, network device 110 may put the link in service in a disabled state and initiate hold-up timer 500.

In still another example, each network device 110 may communicate the states (e.g., active state, disabled state, disabled timer state, maintenance state, etc.) of its LAG links to adjacent network devices 110 connected to the LAG links. Such an arrangement may ensure manageability of signaling between network devices 110 of network 100. Auto-negotiation may support some of such communications by network device 110, but network device 110 may also provide generic mechanisms for communicating LAG link states without interrupting the physical operation of the LAG links with non-compatible systems.

FIG. 7 is a flowchart of an exemplary process 700 for a network (e.g., network 100) and/or a network device (e.g., network device 110). The process of FIG. 7 may be performed by a device of a network or may be performed by a device external to the network but communicating with the network. The process may be performed by network device 110 of FIG. 2 (e.g., by control unit 240) and/or one or more devices in network 100.

As shown in FIG. 7, process 700 may detect a LAG link signal degrade condition(s) (block 710). For example, in one implementation described above in connection with FIG. 4, signal degrade detector 400 may detect signal degrade condition(s) for incoming link signal(s) based on errored frames and/or based on an 8B/10B code violation rate. Both errored frames and 8B/10B code violations may be used by signal degrade detector 400 so that network device 110 may respond to link degradation.

Process 700 may detect a LAG link signal failure condition (s) (block 720). For example, in one implementation described above in connection with FIG. 4, signal fail detector 410 may detect signal failure condition(s) for incoming link signal(s) based on errored frames and/or based on an 8B/10B code violation rate. Both errored frames and 8B/10B code violations may be used by signal fail detector 410 so that network device 110 may respond to link failure.

As further shown in FIG. 7, process 700 may compare the detected signal degrade and/or failure conditions to threshold range(s) (block 730). For example, in one implementation described above in connection with FIG. 4, signal degrade threshold unit 420 may provide a configurable signal degrade threshold range based on errored frames (e.g., about 1 to about 1,000 errored frames in about 100,000 to about 1,000,000 received frames). A configurable signal degrade threshold range based on the 8B/10B code violation rate (e.g., about $10^{-5}$ to about $10^{-9}$) may also be provided by signal degrade threshold unit 420. Signal degrade threshold unit 420 may also provide a clearing threshold range (e.g., one-tenth the threshold range for declaring a signal degrade condition) based on errored frames and/or the 8B/10B code violation rate. In another implementation described above in connection with FIG. 4, signal fail threshold unit 430 may provide a configurable signal failure threshold range based on errored frames (e.g., about 1 to about 1,000 errored frames in about 1,000 to about 100,000 received frames). A configurable signal failure threshold range based on the 8B/10B code violation rate (e.g., about $10^{-3}$ to about $10^{-5}$) may also be provided by signal fail threshold unit 430. Signal fail threshold unit 430 may also provide a clearing threshold range (e.g., one-tenth the threshold range for declaring a signal failure condition) based on errored frames and/or the 8B/10B code violation rate.

Process 700 may generate an alert if the detected signal degrade and/or failure conditions are outside the threshold range(s) (block 740). For example, in one implementation described above in connection with FIG. 4, if a detected signal degrade or signal failure condition is outside of one of the threshold ranges provided by signal degrade threshold unit 420 or signal fail threshold unit 430, threshold alert unit 440 may generate an alert indicating an appropriate signal threshold violation. In one example, to signal that a LAG link should be disabled, network device 110 may send an event notification of the type "Errored Frame Seconds Summary Event TLV" with the "Errored Frame Second Summary" field set to "1's" (e.g., as set forth in Modified IEEE 802.3ah, Clause 57.5.3.4, item f) to a far end of the LAG link (e.g., to another network device 110 connected to the link). This may indicate to the far end of the link that there may be more Errored Frame Seconds than an allowable upper boundary (e.g., 900 seconds as defined by the "Errored Frame Second Summary" field). If an "Errored Frame Seconds Summary Event TLV" with the "Errored Frame Second Summary" field set to "1's" is received, network device 110 may disable the link.

As further shown in FIG. 7, process 700 may place the LAG link in a disabled state or a disabled timer state based on the detected signal degrade and/or failure conditions (block 750). For example, in one implementation described above in connection with FIG. 3, if link health monitor 310 detects a signal and does not detect a remote link fault message, link health monitor 310 may provide information indicating signal detection and no remote link fault message to disabled timer portion 320. Disabled timer portion 320 may place the link in a disabled timer state. If signal degradation or failure is detected, a manual disable command is received, or a remote disable message is received, link health monitor 310 or disabled timer portion 320 may provide information indicating the aforementioned condition(s) to link disabled portion 330. Link disabled portion 330 may disable a link if it receives information indicating signal degradation or failure, a manual disable command, and/or a remote disable message.

Systems and methods described herein may detect LAG link signal degradation and/or failure conditions, and may compare the detected conditions to signal degradation and/or failure threshold ranges. The systems and methods may also generate an alert for the LAG link and may place the LAG link in a disabled timer state and/or a disabled state if the detected conditions of the LAG link are outside the signal degradation and/or failure threshold ranges.

The foregoing description of preferred embodiments provides illustration and description, but is not intended to be exhaustive or to limit the invention to the precise form disclosed. Modifications and variations are possible in light of the above teachings or may be acquired from practice of the invention.

For example, while a series of acts have been described with regard to the flowchart of FIG. 7, the order of the acts may differ in other implementations consistent with principles of the invention. Further, non-dependent acts may be performed in parallel.

In another example, although FIGS. 3-6 show tasks being performed by control unit 240 of network device 110, in other implementations the tasks shown in FIGS. 4-7 may be performed by other components of network device 110, such as, e.g., switching mechanism 220. Alternatively, some of the tasks shown in FIGS. 3-6 may be performed by another device (outside network device 110).

Aspects of the invention, as described above, may be implemented in many different forms of software, firmware, and hardware in the implementations illustrated in the figures. The actual software code or specialized control hardware used to implement aspects consistent with principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
   a plurality of links; and
   at least one processor to:
      define a link aggregation group (LAG) from two or more of the plurality of links,
         the LAG arranging two or more of the plurality of links into a logical port,
      monitor, during a first time period, a signal condition for a LAG link, of the two or more of the plurality of links in the LAG,
      disable the LAG link during a second time period when the signal condition is outside a signal threshold range associated with normal operation of the LAG link,
         the second time period occurring after the first time period, perform maintenance on the LAG link during the second time period,
      the at least one processor, when performing the maintenance on the LAG link, being further to:
         enable the LAG link to receive, during the second time period, first traffic, which is related to the maintenance, and second traffic, which is unrelated to the maintenance,
         enable the LAG link to transmit the first traffic and not the second traffic, and
         monitor transmission of the first traffic by the LAG link, and
      reactive the disabled LAG link based on a first occurring one of:
         the signal condition being within the signal threshold range with respect to the transmission of the first traffic during the second time period, or
         expiration of the second time period.

2. The device of claim 1, where the at least one processor is further to:
   generate an alert for the LAG link when the monitored signal condition is outside the signal threshold range.

3. The device of claim 1, where the LAG link is associated with the signal degrade condition when the signal condition is within a signal degrade threshold range.

4. The device of claim 3, where the signal degrade condition is detected based on at least one of errored frames or a code violation rate.

5. The device of claim 1, where the LAG link is associated with a signal failure condition when the signal condition is within a signal failure threshold range.

6. The device of claim 5, where the signal failure condition is detected based on at least one of errored frames or a code violation rate.

7. The device of claim 1,
   where the processor, when reactivating the LAG link, is further to:
      prevent new traffic from being received by the LAG link during a third time period after the LAG link is reactivated.

8. The device of claim 1,
   where the processor, when reactivating the LAG link, is further to:
      prevent new traffic, received by the LAG link, from being transmitted by the LAG link during a third time period after the LAG link is reactivated.

9. A method comprising:
   monitoring, by a network device, a signal condition associated with a link aggregation group (LAG) link during a first time period,
      an associated LAG arranging multiple links, that include the LAG link, into a logical port;
   comparing, by the network device, the signal condition to a signal threshold range associated with normal operation of the LAG link;
   disabling, by the network device and during a second time period, the LAG link when the signal condition is outside the signal threshold range,
      the second time period occurring after the first time period;
   performing, by the network device, maintenance on the LAG link during the second time period,
      performing the maintenance on the LAG link including:
         enabling the LAG link to receive, during the second time period, first traffic, which is related to the maintenance, and second traffic, which is unrelated to the maintenance,
         enabling the LAG link to transmit the first traffic without transmitting the second traffic, and
         monitoring transmission of the first traffic by the LAG link; and reactivating the disabled LAG link based on a first occurring one of:
         the signal condition being within the signal threshold range with respect to the transmission of the first traffic during the second time period, or
         expiration of the second time period.

10. The method of claim 9, further comprising:
    generating an alert for the LAG link when the signal condition is outside the signal threshold range.

11. The method of claim 10, where the LAG link is associated with the signal degrade condition when the signal condition is within a signal degrade threshold range.

12. The method of claim 11, where the signal degrade condition is detected based on at least one of errored frames or a code violation rate.

13. The method of claim 9, where the LAG link is associated with a signal failure condition when the signal condition is within a signal failure threshold range.

14. The method of claim 13, where the signal failure condition is detected based on at least one of errored frames or a code violation rate.

15. The method of claim 9, where reactivating the LAG link includes:
preventing new traffic from being transmitted by the LAG link for at least a particular period of time after the LAG link is reactivated.

16. The method of claim 9, where reactivating the LAG link includes:
preventing new traffic from being received by the LAG link during a third time period after the LAG link is reactivated.

17. A non-transitory computer readable medium storing instructions, the stored instructions comprising:
one or more instructions that, when executed by a processor of a network device, cause the processor to monitor a signal condition associated with a link aggregation group (LAG) link during a first time period,
an associated LAG arranging multiple links, included in the LAG link, into a logical port;
one or more instructions that, when executed by the processor, cause the processor to disable the LAG link, during a second time period, when the signal condition is outside a signal threshold range associated with normal operation of the LAG link,
the second time period occurring after the first time period; and
one or more instructions that, when executed by the processor, cause the processor to perform maintenance on the LAG link during the second time period,
the one or more instructions to perform the maintenance including:
one or more instructions to enable the LAG link to receive, during the second time period, first traffic, which is related to the maintenance, and second traffic, which is unrelated to the maintenance,
one or more instructions to enable the LAG link to transmit the first traffic and prevent transmission of the second traffic, and
one or more instructions to monitor transmission of the first traffic by the LAG link,
one or more instructions that, when executed by the processor, cause the processor to reactive the disabled LAG link based on a first occurring one of:
the signal condition being within the signal threshold range with respect to the transmission of the first traffic during the second time period, or
expiration of the second time period.

18. The non-transitory computer readable medium of claim 17, where the stored instructions further include:
one or more instructions to prevent new traffic from being transmitted by the LAG link, after the LAG link is reactivated, during a third time period.

19. The non-transitory computer readable medium of claim 17, where the stored instructions further include:
one or more instructions to reactivate the LAG link prior to the expiration of the second time period and prior to completion of the maintenance based on detecting that more than a particular number of the links in the LAG are disabled during the second time period.

20. The device of claim 1, where the at least one processor is further to:
forward a copy of the second traffic to another LAG link, of the two or more of the plurality of links, for transmission during the second time period.

21. The non-transitory computer readable medium of claim 17, where the stored instructions further include:
one or more instructions to forward a copy of the second traffic to another LAG link, of the multiple links included in the LAG, for transmission during the second time period.

* * * * *